Patented Aug. 19, 1947

2,425,772

UNITED STATES PATENT OFFICE 2,425,772

POLYMERIC CYANINE DYESTUFFS

Cyril D. Wilson, Metuchen, N. J., assignor, by mesne assignments, to E. I. du Pont de Nemours & Company, Wilmington, Del., a corporation of Delaware No Drawing. Application September 3, 1941, Serial No. 409,433

12 Claims. (Cl. 260—240)

This invention relates to new chemical compounds and to their preparation. More particularly, it relates to new polymeric dye intermediates and polymeric dyes and to their preparation and use. Still more particularly it relates to polymeric compounds which have photographic sensitizing properties. Still more particularly it relates to polymeric organic compounds containing cyanine dye components and to their preparation and use.

An object of this invention is to provide new types of polymeric organic compounds. A further object is to provide a new class of polymeric dye intermediates. A still further object is to provide polymeric dyes containing a plurality of cyanine dye components. Yet another object is to provide a simple and economical method of preparing polymeric dye intermediates and dyes. Another object is to provide new photographic compositions such as silver halide emulsions, containing polymeric dyes, and treating solutions therefore. Still other objects will be apparent from the following description of the invention.

It has been found that new compounds can be made by reacting a heterocyclic nitrogen base with a polyfunctional organic compound containing a plurality of functional groups each of which is capable of forming quaternary ammonium salts with ternary nitrogen compounds. At least one mol of base is used for each functional group. The resulting products which contain a polyvalent organic radical between or linked to notrogen atoms of the heterocyclic nitrogen compounds can then be condensed with other compounds to form still other types or modified types of polymers.

The invention can be applied to a large and diverse group of heterocyclic nitrogen compounds containing (1) a trivalent heterocyclic nitrogen capable of forming quaternary or cyclammonium salts with alkyl salts e. g. ethyl iodide, methyl-p-toluene sulfonate, etc., and (2) a reactive group. The resulting bis-, tris- etc. or polymeric salts are new and useful compounds. Since they still contain reactive groups they can (a) be condensed with other dyestuff components to form polymeric dyes or (b) condensed with organic compounds to form intermediates with a different reactive group which may be subjected to a dye condensation reaction to form a polymeric dye.

A large variety of polymeric dyestuffs containing at least two dyestuff nuclei linked through heterocyclic nitrogen atoms by a polyvalent hydrocarbon radical having an acyclic carbon atom attached to said nitrogen atoms, can thus be prepared in accordance with the teachings hereof.

An important aspect of the invention is concerned with the preparation of polymeric cyanine dyes wherein the cyanine dye nucleus repeats itself at least two times, the nuclei being linked through a divalent hydrocarbon radical which is attached through a non-aromatic carbon atom or atoms to heterocyclic nitrogen atoms of said nuclei. By "cyanine dye nuclei" is meant an entire cyanine dye structure and not a heterocyclic radical thereof. In other words the dye nuclei which appear two or more times in the polymers consist of two heterocyclic nitrogen nuclei which are connected to each other by a chain of conjugated double bonds between heteronitrogen atoms thereof. One or more of the nitrogen atoms of each nucleus is attached to a divalent hydrocarbon radical as previously explained to form the polymeric structure.

In the case of the monomethine cyanines and polymethine-cyanines two heterocyclic nuclei are joined through a methine or hydrocarbon substituted methine (—CR=), group or a polymethine (—CR=)$_n$ group which is attached to carbon atoms thereof. In the formulae R is hydrogen or a hydrocarbon radical and $n$ is a small positive integer. The polymethine type include carbocyanines, dicarbocyanines, tricarbocyanines, etc. Two or more of such nuclei are linked to a polyvalent hydrocarbon radical which is attached to hetero-nitrogen atoms through an acyclic carbon atom or atoms.

Polymeric dyes having no linking chain such as the apocyanines as well as those containing non carbon atoms in the linking chain such as the cyazines and carbocyanines which contain a nitrogen atom or a plurality of nitrogen atoms and/or methinyl groups which may form part of a ring also come within the invention. These compounds likewise have a chain of conjugated double bonds between hetero-nitrogen atoms. The nuclei are linked by a divalent hydrocarbon radical attached through hetero-nitrogen atoms and acyclic carbon atoms.

Polymeric merocyanine dyes which contain at least two merocyanine dye nuclei linked by a divalent hydrocarbon radical which is attached to heterocyclic nitrogen atoms through an acyclic carbon atom constitute a further aspect of the invention.

Polymeric dyes obtainable in accordance with the teachings hereof fall within the general formula:

(1)                 (R—A—R)$_n$ wherein R is a cyanine dye nucleus, A is a polyvalent hydrocarbon radical and $n$ is a positive integer.

These dyes are made as previously explained from bis-type quaternary salts of the general formula:

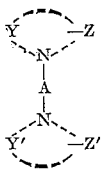

wherein Z and Z' are the same or different and constitute a reactive group capable of dye condensation and Y and Y' are the same or different and constitute the atoms necessary to complete a heterocyclic nitrogen nucleus. One or both of the N atoms may be part of a salt group.

The invention will be more readily understood by a consideration of a more specific aspect thereof. A heterocyclic ammonium base containing a reactive group which can be used in cyanine dye condensations such as methyl benzothiazole is reacted with a polyfunctional agent such as propylene dibromide and a bis-type quaternary salt is formed. The resulting salt which now contains two reactive groups can then be subjected to a dye condensation reaction, for instance, with an ortho ester in the presence of an acid binding agent to form a polymeric dye.

The first mentioned reaction might be regarded as proceeding in accordance with the equation:

(2) 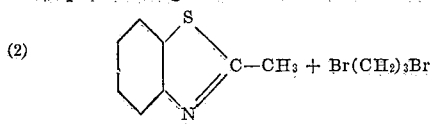

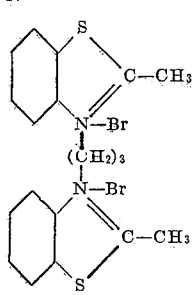  (3)

However the compound α-methyl benzothiazole in some instances may react as though it contains a reactive methylene group, whereupon the base could be regarded as having the formula:

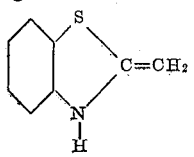

Based upon this formula it is possible that the resulting bis-type quaternary salt might have one or two ternary nitrogen atoms by reason of one or two molecules of HBr splitting off if a strong base is present. Following this theory, it is possible that the resulting dye intermediate may have the formula:

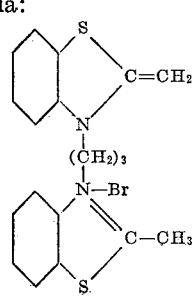  (4)

or

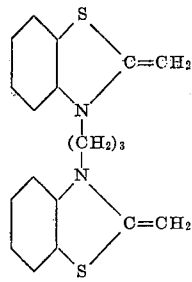  (5)

Assuming the bis-type quaternary salt has formula (4) or (3), the reaction with ethyl ortho formate in the presence of an acid binding agent, e. g. pyridine under reflux conditions, might be regarded as taking place in the following two manners:

(A)

(B)

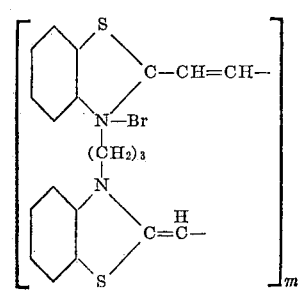

wherein $m$ represents an indeterminate positive integer.

The physical appearance of the compounds obtained by the exemplary procedure outlined above is indicative that the second equation or possibly a combination of Equations A and B represents the actual reaction.

Compounds of types (4) and (5) can of course be prepared by heating bis-type salts of formula (3) with agents which will remove HBr or HX therefrom wherein X is an anion. Thus heating in the presence of a strong base such as caustic soda will result in compounds of formulae (4) and (5), the particular type depending upon the duration of reaction and concentration of reactants. Compounds of the last mentioned type, which are polymeric bases, however, do not undergo all of the dye condensation reactions which can be applied to those of formulae (3) and (4).

The invention, in a broad sense, as before stated may be applied to any heterocyclic nitrogen base containing a reactive group which can be condensed to form a dye. In addition to reactive methyl and methylene groups mention is made of reactive halogen groups, alkyl-thio- and alkylseleno-ether groups; acylmethylene derivatives formed by the condensation of a reactive methyl group with an acyl halide, i. e. acetyl chloride, propionyl chloride, crotonyl chloride, benzoyl chloride etc.; thione or selenone groups; nitrosoamine groups; β-anilinovinyl groups; amino groups; hydrazine groups e. g. =N—NH₂; cyano groups; and α-ethyl groups etc.

Some of the aspects of the invention are illustrated below wherein a heterocyclic nitrogen base having in one of its tautomeric forms one of the formulae:

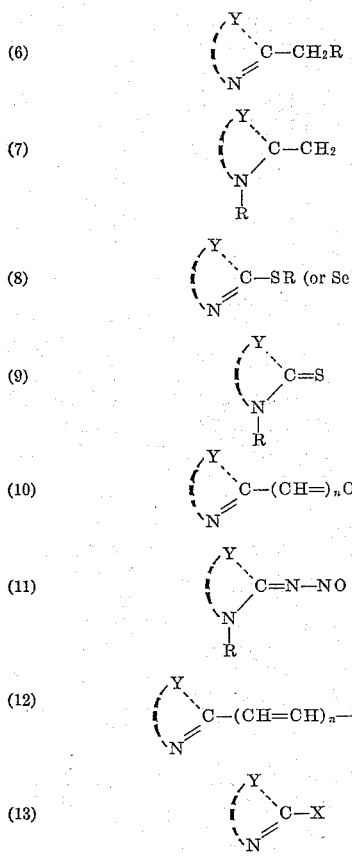

wherein R and R′ represent a hydrogen atom or a hydrocarbon radical, e. g. alkyl, Y represents the non-metallic atoms necessary to complete a 5- or 6-membered heterocyclic nucleus; is used as a reactant with the polyfunctional reagent, $n$ is a small positive integer and X is halogen e. g. Cl, Br, I. In the above formulae Y may form with the carbon and nitrogen atoms a 5-membered heterocyclic nucleus containing two nuclear non-metallic atoms other than carbon, one of which non-metallic atoms is trivalent nitrogen and the other, a divalent non-metallic atom, such as oxygen, sulfur, selenium or a divalent hydrocarbon radical such as

wherein $R_1$ and $R_2$ are alkyl radicals; or a 6-membered heterocyclic nucleus containing one nuclear hetero atom, e. g. trivalent nitrogen and the balance carbon atoms.

By heterocyclic nucleus as described above, it is intended that both substituted and unsubstituted heterocyclic rings are included, including, for instance, benzoxazoles, benzothiazoles, benzoselenazoles, benziminazoles, thiazoline and the corresponding naphthazoles and anthracenazoles, etc., pyridine, quinoline, naphthopyridine, etc. Various types of substituents may be present in the benzene nuclei, e. g. hydrocarbon, hydroxy, alkoxy, amino and substituted amino groups. Substituents may also be present in the pyridine nuclei.

In a further aspect, another class of heterocyclic compounds which may be employed in the invention corresponds to the following formula:

wherein W is either =C=S, =C=Se, or =C=O and Z represents the non-metallic atoms necessary to complete a five-membered keto-heterocyclic nucleus containing two nuclear non-metallic atoms other than carbon, at least one of which is trivalent nitrogen, and =CH₂ is intracyclic reactive methylene group. Compounds of this type include a thiazolone, an oxazolone, an imidazolone, a pyrazolone, etc. for example, compounds such as rhodanines, 2-thio-2,4(3,5) oxazoledione nucleus, hydantoins and nitrogen-substituted derivatives, pyrazolones and thio-pyrazolones; in addition Z represents the non-metallic atoms necessary to complete a six-membered keto-heterocyclic nucleus, for example, a six-membered heterocyclic nucleus containing two nuclear trivalent nitrogen atoms and four nuclear carbon atoms such as barbituric acids, and a reactive group such as an intracyclic reactive methylene group.

Various types of polyfunctional organic hydrocarbon compounds can be used in the production of the bis type quaternary salts and bases. Among the useful bifunctional types are alkylene polyhalides, cycloalkylene polyhalides, alkyl esters of alkylene and cycloalkylene sulfonic acids, alkyl esters of arylene sulfonic acids, dialkyl esters of alkylene disulfuric acid and mixed compounds containing the above functional groups.

The bis-type quaternary salts and bases can be dye condensed to form polymeric symmetrical dyes having the general formula (1) wherein the R's are the same or different in various manners which will be outlined below.

Polymeric erythro- and xanthoapocyanines can be prepared by heating a bis-type quaternary salt of quinoline in an alcoholic potassium hydroxide solution e. g. methyl or ethyl alcohol solution.

Bis-type azocyanines can be obtained by condensing a bis-type quaternary salt of a heterocyclic nitrogen base which contains an amino group in the alpha position to the cyclic nitrogen atoms, e. g., ethylene bis α-aminobenzothiazole dichloride, with an α-halogen substituted alkyl quaternary salt, e. g., α-iodoquinoline ethyl chloride, in the presence of sodium ethoxide. Or alternatively the bis-type salt may contain a reactive halogen and the other cycloammonium salt an amino group in the α-position to the nitrogen atom.

Polymeric carbocyanine dyes may be made by condensing a N:N' alkylene bis-type derivative of a heterocyclic nitrogen base containing a methylene group in the position alpha to the nitrogen atom with compounds of the formula:

wherein W is a group such as halogen, amino, alkoxy, acyl, etc. in the presence of an organic acid anhydride, e. g. acetic anhydride, and following said condensation by reacting the resulting products with a hydrocarbon salt of a quaternary nitrogen compound containing a reactive methyl group in the α or γ position to the nitrogen atom.

In addition to the ortho ester method of preparing polymeric carbocyanine and centrally substituted carbocyanine dyes set forth above, other polymeric dyes can be obtained by reacting one mol of the bis-type quaternary salts containing reactive groups with diarylformamidine or a C-alkyl substituted diarylformamidine in the presence of acetic anhydride and a further reacting of the intermediate thus formed with another mol of the same bis-type quaternary salt or a different heterocyclic quaternary salt having a reactive group e. g. methylene, methyl, mercaptoether, halogen, etc., group.

Symmetrical polymeric dicarboxyanines can be obtained by reacting two mols of the bis-type salts with one mol of anilido-acrolein anil in the presence of an organic nitrogenous base having a dissociation constant greater than ammonia, e. g. pyridine, dimethylamine, trimethyl amine, diethylamine, triethylamine, dimethyl amine, etc., or a strong inorganic base, e. g., potassium hydroxide or sodium hydroxide. In a similar manner, β-ethoxy acrolein acetal or propargyl acetal can be used in place of said anil.

The production of symmetrical polymeric tricarbocyanines may be accomplished by reacting two mols of the polymeric or bis-type quaternary cycloammonium salts containing reactive groups, with one mol of glutaconic aldehyde dianilide in the presence of a base such as pyridine, piperidine, tetramethylene diamine-1,4, etc.

By condensation of the quaternary bis-type cycloammonium salts containing reactive methyl or methylene group in the α or γ position to the cyclic nitrogen atoms, with a dialkylaminobenzaldehyde in the presence of a basic condensing agent, e. g. piperidine, bis-type styryl dyes are obtained.

Bis-type-merocyanines can be advantageously prepared from the bis-type quaternary salts containing reactive methyl or methylene group in the α or γ position to the cyclic nitrogen atoms, by condensing about one mol of the latter with one mol of an active ketomethylene compound in the presence of an acid binding agent, e. g. piperidine, dimethylamine, etc.

Carbocyanine dyes of a polymeric type can be prepared by condensing the bis-type or polymeric cycloammonium quaternary salts containing reactive methyl or methylene groups in the α or γ position to the cyclic nitrogen atom with an acyl methylene derivative of a tertiary cyclammonium compound i. e. 1 acetyl methylene 2 ethylbenzothiazoline etc. in the presence of an acid binding agent, e. g. pyridine, dimethylamine, etc.

Polymeric 2-4' cyanines or carbocyanines can be prepared by condensation of 2 molecules of an alpha-gamma disubstituted cyclammonium quaternary salt containing reactive halogen e. g. iodine, or methyl substituents in the presence of sodium ethoxide in alcoholic solution.

Carbocyanine dyes of a polymeric structure can be obtained by the condensation of 2 molecules of an alpha methyl cyclammonium quaternary bis-type salt with one molecule of glyoxylic acid in the presence of alkali e. g. caustic soda.

Polymeric carbocyanine dyes can be prepared by the reaction of 2 molecules of an alpha methyl cyclammonium quaternary bis-type salt with paraformaldehyde in the presence of alkali e. g. alcoholic KOH aqueous sodium hydroxide etc.

Polymeric carbocyanines in which the heterocyclic ring systems are connected by a cyclic chain may be produced by condensing a compound selected from the group of orthoaminophenols, orthoaminothiophenols and orthoaminoselenophenols with a dibasic organic acid containing 3 to 8 carbon atoms, converting the product into a bis-type quaternary salt after the manner described above and condensing said salt with an ortho ester type of an organic acid.

Polymeric carbocyanine dyes may be prepared by the reaction of three mols of a bis-type cyclammonium salt containing a reactive methyl or methylene group such as hexamethylene bis α-methyl benzothiazole bromide in the presence of 3 mols of an organic base such as piperidine and triethylamine, α-picoline etc.

Carbocyanine dyes having a polymeric structure may be prepared by condensing 1 mole of a bis-type quaternary cyclammonium salt having a reactive methyl or methylene group with one mole of an alkyl ester of an arylated thioimide such as ethylisothioacetanilide in the presence of an organic monocarboxylic acid anhydride e. g. acetic anhydride and further condensing the product with an additional mole of a monomeric quaternary cyclammonium salt of the same or different type of heterocyclic base in the presence of an organic acid binding agent e. g. pyridine, piperidine, etc.

Cinnamylidine derivatives may be prepared by condensing p-dialkyl amino cinnamic aldehydes with a bis-type cyclammonium quaternary salt containing a reactive methyl group substituted in the position alpha to the nitrogen atom.

Polymeric cyadiazines can be prepared by condensing heterocyclic nitrogen bases having a hydrazine grouping (i. e. =N—NH₂) in the position alpha to the nitrogen atom with an aldehyde of a bis-type or polymeric cyclammonium quaternary salt.

Trinuclear cyanine dyes having a polymeric structure can be made by reacting a 2,4-dihalogeno type quaternary salt with two mols of a cyclammonium salt containing a reactive alkyl group e. g. α-methylbenzothiazole in the presence of a strong basic condensing agent, preferably a tertiary organic base.

Polymeric cyazine dyes may be produced by reacting a bis-type quaternary or cyclammonium salt having an amino or imino group in the α or γ position to the nitrogen atom with either a quaternary salt of a further heterocyclic nitrogen compound having a reactive aminovinyl, thioether or selenoether grouping (including the reactive grouping of an alkyl salt of an N— alkyl thione or selenone) or substituted forms thereof in the α or γ position to a nitrogen atom, or with a quaternary salt of a 2-halogenated compound of the quinoline series, or with an aromatic aldehyde, or with an orthoester of a mono-carboxylic acid.

Polymeric isocyanine dyes can be prepared by condensing the bis-type quaternary salts of alpha methyl pyridinium type bases with quaternary salts of gamma unsubstituted pyridinium bases in the presence of an alkali metal alcoholate e. g. sodium methoxide in methanol.

Isocyanine dyes having a polymeric structure can also be prepared by condensing bis-type quaternary cyclammonium salts containing active methyl groups in the alpha position to the intracyclic nitrogen thereof with bis-type quaternary salts of pyridinium type bases substituted in the gamma position by cyanide groupings, in the presence of alcoholic potassium hydroxide or a similar strong base.

Merocyanine dyes having more than one dye nucleus can be prepared by the reaction of a compound such as phenyl rhodanine with a bis-type quaternary salt of an aminovinyl azole such as 1-(B-acetanilido vinyl) benzoxazole in the presence of basic condensing agent, e. g. pyridine, dimethyl aniline, etc.

Polymeric psuedocyanine dyes can be prepared by reacting a bis-type cyclammonium salt of quinaldine with diorthoformylethylaminodiphenyl disulfide in hot pyridin or another tertiary amine.

Tricarbocyanine dyes having a polymeric structure can be prepared by the reaction of bis-type quaternary cyclammonium compounds containing a reactive methyl group with a compound such as dinitrophenyl pyridinium chloride or a pyridinium cyanohalogenide in the presence of a strong organic base such as tertiary amine.

Polymeric unsymmetrical tricarbocyanines can be prepared by the reaction of a bis-type quaternary ammonium salt of a heterocyclic base containing in alpha position to the nitrogen atom a methyl group capable of reaction with an amino epsilon imido-alpha-gamma pentadiene hydrohalogenide in the presence of an acid binding solvent.

Polymeric merocyanine dyes can be made from the bis-type cyclammonium salts containing a group =CH—CHO attached to a carbon atom in the heterocyclic ring with an acid of the formula RCO—NH—CH₂COOH wherein R is alkyl or aryl in the presence of a water-binding agent particularly anhydrides of fatty acids of 2 to 4 carbon atoms. Alternatively the bis-type salts containing a reactive methyl group in the α or γ position to the nitrogen atom can be treated with derivatives formed by the interaction of a diaryl-formamidine and a methyl-phenylpyrazolone or a diphenylpyrazolone.

From the above discussion, it will be apparent that the invention comprehends the production of several new classes of polymeric dyes. One important class of dyes may be represented as having one of the following formulae:

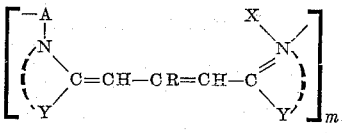

(a)

(14)

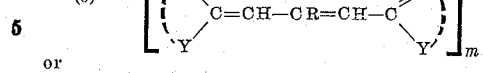

(b)

or

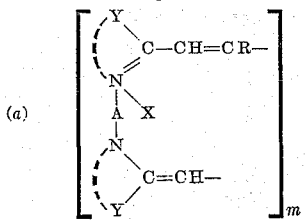

(15)

In each of the formulae (14) (a) and (b) and (15) Y and Y' are the same or different and constitute the atoms necessary to complete a pyridine, dialkyl-indolenine or azole nucleus including an iminazole nucleus, R is hydrogen or a monovalent hydrocarbon radical, X is the negative radical of an acid, A is a divalent hydrocarbon radical. When Y constitutes the atoms necessary to complete a pyridine nucleus the conjugated acyclic chain may be attached to alpha carbon atoms.

The non-cyclic types of carbocyanine or substituted carbocyanine polymers may be further exemplified by the following formula which shows the relationship of the polymer chain and end groups.

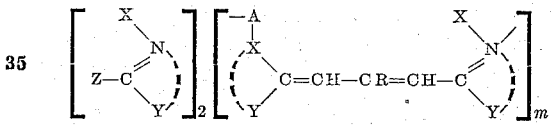

The polymeric cyanine dyes obtainable by the invention are very well suited for sensitizing gelatino silver halide emulsions and the invention includes silver halide emulsions sensitized by means of the novel dyes as well as processes of sensitizing such emulsions with the dyes. The dye may be incorporated in the emulsions at any desired stage in its production or the finished emulsion layer may be bathed in a solution of the dye.

The invention will be more fully illustrated but is not intended to be limited by the following examples.

EXAMPLE I

*Polymeric (3-3' dipropylene thiacarbocyanine bromide)*

A 3 g. portion of 2-methylbenzothiazole was mixed with 2 g. of propylene dibromide and the mixture heated for twelve hours at 130–140° C. The product was then dissolved in 20 ml. of pyridine, heated to a temperature at which reflux distillation just began and 5 ml. of ethyl orthoformate were added. As the orthoformic ester entered the reaction a deep magenta color was obtained. After refluxing for one hour the mixture was cooled, diluted with ether and filtered. The solid was recrystallized from alcohol and dried. The reaction yielded 0.3 gram of green crystals having the probable formula:

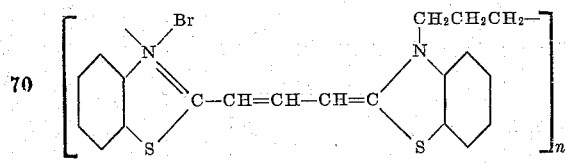

where $n$ is a whole number larger than 1.

This dye, dissolved and added in a concentration of 35.5 milligrams per liter to a gelatino silver bromide emulsion, extended the sensitivity to 6300 Å. with a maximum of 6000 Å. and a minimum at 4800 Å. In a concentration of 23 milligrams per liter in a silver chloride emulsion the sensitivity was extended to 6500 Å. with a maximum at 6000 Å. and a minimum at 4800 Å.

EXAMPLE II

*Polymeric (3-3'-dipropylene-9-methyl thiacarbocyanine bromide)*

The compound 3-3'-propylene bis 2-methylbenzothiazole dibromide was prepared from 3 grams of 2-methylbenzothiazole and 2 grams of propylene dibromide by a process similar to that described in Example I. The resulting compound was then dissolved in 20 ml. of pyridin to which was added 6 ml. of ethyl orthoacetate after the solution had been brought to a boil in a flask fitted with a reflux condenser. Refluxing was continued for one-half hour, following which the material in the flask was cooled, extracted with ether and recrystallized twice from ethyl alcohol. The reaction yielded 0.4 gram of soft bronze green crystals having the formula:

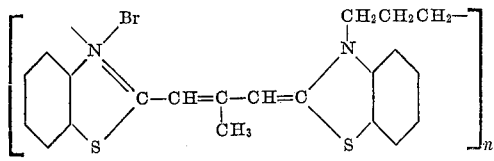

where $n$ is a whole number larger than 1.

A concentration of 35.5 milligrams of this dye added to a liter of a gelatino silver bromide emulsion extended the spectral sensitivity of the emulsion to 6300 Å. Sensitivity maxima were produced at 5400 Å. and 5900 Å., with minima at 5100 Å. and 5600 Å. In a silver chloride emulsion at a concentration of .23 grams per liter the sensitivity was extended to 6500 Å. with a maximum at 6000 Å. and a minimum at 4700 Å.

EXAMPLE III

*Polymeric (3-3'-dipropylene-9-ethyl thiacarbocyanine bromide)*

A mixture of 3 grams of 2-methylbenzothiazole and 2 grams of propylene dibromide was heated for 4 hours at 130° C. The product was taken up in 40 ml. of dry pyridin, heated to refluxing and 5 ml. of ethyl ortho propionate added thereto. The mixture was refluxed 4 hours during which time a magenta color formed. At the end of the reflux distillation the mixture was poured into cold water, producing a dark, tacky solid. The precipitate was washed with water, recrystallized from alcohol and dried. The substance could not be effectively crystallized and after the treatment described, still remained a gummy, dark mass. The compound had the formula:

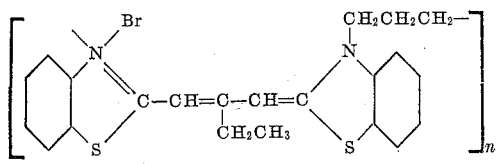

where $n$ is a whole number larger than 1.

EXAMPLE IV

*Polymeric (3-3 dihexamethylene thiacarbocyanine iodide)*

Three grams of 2-methylbenzothiazole were mixed with 2.44 grams of hexamethylene dibromide and heated to 130° C. for 4 hours. The product was taken up in 40 ml. of pyridine and heated to boiling in a flask fitted with a reflux condenser. At this point, 5 ml. of ethyl orthoformate was added to the mixture and refluxing continued for three and one-half hours. A purple color was produced.

The solution was diluted to 2 liters with water containing an excess of potassium iodide, whereupon a heavy oily liquid was precipitated. This oil was filtered off, boiled in 500 cc. of alcohol, filtered while hot and 50% of the solvent removed from the filtrate by evaporation. When cooled, a quantity of soft, gummy material was precipitated; when ether was added to the mixture, additional precipitation occurred. Attempts to recrystallize the compound from absolute alcohol were unsuccessful so the compound was evaporated to dryness, redissolved in alcohol and then crystallized by the rapid addition of a large volume of ether. The precipitated crystals were filtered off, washed in ether and weighed. A yield of 2 grams of green crystals were obtained by the process. The compound recovered had the formula:

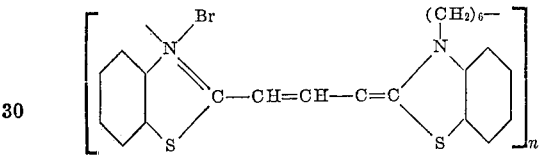

where $n$ is a whole number larger than 1.

A 35.5 milligram portion of this dye added to a liter of a gelatino-silver bromide emulsion produced an extension of the spectral sensitivity to 6300 Å. with a maximum at 6000 Å. and a minimum at 5100 Å. A concentration of 23 milligrams per liter in a silver chloride emulsion extended the sensitivity to 6400 Å. with a maximum at 6000 Å. and a minimum at 4700 Å.

EXAMPLE V

*Polymeric (3-3'-dihexamethylene-9-methyl thiacarbocyanine iodide)*

Three grams of 2-methylbenzothiazole were mixed with 2.44 grams of hexamethylene dibromide and the mixture heated for four hours at 130° C. The product was taken up in 40 ml. of dry pyridine which was raised to the boiling point, following which 5 ml. of ethyl orthoacetate was added thereto. Refluxing was continued for four hours and a magenta color was produced. When treated with water and potassium iodide as in the preceding example, a dark, tacky solid was precipitated. This was filtered off, washed with water, recrystallized from 500 ml. of alcohol, dried and weighed. A 0.1 gram yield of dark, purplish crystals was obtained.

This dye added to a gelatino-silver chloride emulsion in a concentration of 23 milligrams per liter extended the sensitivity to 6200 Å. with a maximum at 5800 Å. and a minimum at 4700 Å.

EXAMPLE VI

*Polymeric (3-3'-dihexamethylene-9-ethyl thiacarbocyanine iodide)*

The exact procedure of Example V was repeated using ethyl ortho propionate in place of ethyl orthoformate. The product was a tacky solid.

It is to be understood, however, that the invention as outlined above is not limited to the reaction of heterocyclic nitrogen bases containing a single heterocyclic nucleus with the polyfunctional reagents to produce polymeric or bis-type salts. On the contrary, it is equally applicable to the bisazoles such as the benzo-bis-thiazoles, -oxazoles, -iminazoles and -selenazoles whereby a decidedly novel type of salt is formed which may be condensed with other heterocyclic nitrogen compounds or with themselves in the manner described above to produce novel dyes. Suitable specific bis-azoles include 2,6-dimethyl-para-beta-benzobisthiazole, 2,6-dimethyl-meta-alpha-benzobisthiazole, 2,7-dimethyl-meta-beta-benzobisthiazole, 2,6-dimethyl para-beta-selenazolobenzothiazole, 2,6 - dimethyl-para-beta-benzobisselenazole, 2,6-dimethyl-meta-alpha-benzobisoxazole and 2,7-dimethyl meta-beta-benzobisoxazole.

Similarly in place of 2-methylbenzthiazole can be substituted a legion of other heterocyclic nitrogen bases which contain reactive groups and are capable of forming alkyl salts in similar amounts. Suitable specific bases include alpha picoline, gamma picoline, 2,6 lutidine, 2,4 lutidine, 2,5 lutidine, 2-methylbenzoxazole, 2-methyl β naphthoxazole, 2-methylbenzselenazole, 2-methyl-beta-naphthothiazole, 1-methyl alpha naphthothiazole, 2-methyl thiazole, 2-methyloxazole, 2-methyl-6-aminobenzothiazole, 2 - methyl - 5 - amino - benz-thiazole, 2,6-dimethyl-5-amino-benz-thiazole, 2,4-dimethyl-6-amino-benz-thiazole, 2,4,6-trimethyl-7-amino-benz-thiazole, 2-methyl-6-diethylamino-benz-thiazole, 2-methyl-5-dimethylamino-benz-thiazole, 2,4-dimethyl-6-phenylamino-benz-thiazole, 2-methyl-6-acetylamino-benz-thiazole, 2,4,6-trimethyl-7 - acetylamino-benzthiazole, 2,5-dimethyl 4 acetyl thiazole, 2,5-dimethyl 4-benzoyl thiazole, 2,5-dimethyl-4-picolinyl thiazole, 2,5-dimethyl-4-thiazole carboxyanilide, 2-methyl-5-(2-pyridyl)-4 - thiazole carboxanilide, ethyl-2,5-dimethyl - 4 - thiazole carboxylate, 2-methyl - 4 - furylthiazole, 2 - methyl - 4 - thienyl thiazole, 2 - methyl - 4 - (2 - pyridyl) thiazole and the corresponding oxazoles and selenazoles, 2 - methyl - 5 - ethoxy benzthiazole, 2,5,5-trimethyl-benzselenazole, 2 - methyl - 5:6-dimethoxy - benz - thiazole, 2 - methyl - 5 - methoxyselenazole, 2 - methyl - 6 - ethoxy-benz-thiazole, 5:6-diethoxyl benzothiazole, α-methyl-4:5-methylenedioxy benzthiazole, lepidine, 6-methyl lepidine, 1,3,3-trimethyl-2-methylene indoline, N-ethyl-2-methylene dihydroquinoline, N-ethyl-6,7-dimethyl-2-methylenedihydroquinoline, N-methyl-2-methylene benzthiazole, N-methyl-6-chloro-2-methylene dihydroquinoline, 1,3,3-trimethyl-2-methylene naphthindoline, 2-methyl thiazoline, 2-methyl selenazoline, 2,6-dimethyl pyridine, 2,6-dipropyl pyridine, 2 methyl-6-ethyl pyridine, 2,4,6-trimethyl pyridine, 2,6-dimethyl-4-phenyl pyridine, 2,6-dimethyl-4-benzyl-pyridine.

Among the useful 5-membered heterocyclic ketomethylene compounds, which can be used in the procedures outlined above are 2,4(3,5)-thiazoledione, 3-alkyl-2,4(3,5)-thiazoledione, 3-phenyl-2,4(3,5) - thiazoledione or 3 - naphthyl-2,4(3,5)-thiazoledione, a 2-thio-2,4(3,5)-thiazoledione (a rhodanine) nucleus, such as 3-alkyl-2-thio-2,4(3,5)-thiazoledione (3-alkylrhodanine, 3-phenyl-2-thio- 2,4(3,5)-thiazoledione (3-phenylrhodanine), 3-naphthyl-2-thio-2,4(3,5)-thiazoledione (3-naphthylrhodanine), 2,4-dithio-2,4(3,5) thiazoledione or its 3-alkyl,3-phenyl or 3-naphthyl derivatives, a 2-alkylmercapto-4(5)-thiazolone nucleus, such as 2-ethylmercapto-4(5)-thiazolone, a 2,4(3,5)-thiazoledione nucleus, such as 2,4(3,5)-thiazoledione or its 3-alkyl, 3-phenyl or 3-naphthyl derivatives, a thiazolidone nucleus, such as 4-thiazolidone or thiazolidone nucleus, such as 4-thiazolidone or its 3-alkyl, 3-phenyl or 3-naphthyl derivatives, 2,4(3,5)-imidazoledione or its 3-alkyl, 3-phenyl or 3-naphthyl derivatives, as well as its 1,3-dialkyl, 1-alkyl-3-phenyl, 1-alkyl - 3 - naphthyl, 1,3 - diphenyl, etc., derivatives, 2-thio-2,4(3,5)-imidazoledione or its 3-alkyl, 3-phenyl or 3-naphthyl derivatives, as well as its 1,3-dialkyl, 1-alkyl-3-phenyl, 1-alkyl-3-naphthyl, 1,3-diphenyl, etc., derivatives, a 5-thiopyrazolone, such as 1-phenyl-3-methyl-5-thiopyrazolone; an oxindole nucleus, such as 2,3-dihydro-3-ketoindole.

Additional suitable 6-membered heterocyclic keto methylene compounds include 2,4,6-triketohexahydropyrimidine, barbituric acid, 2-thiobarbituric acid and its 1-alkyl or 1,3-dialkyl derivatives, 3,4-dihydro-2(1) quinoline, 3,4-dihydro-2(1) quinoxalone etc.

A large number of polyfunctional organic compounds can be used in the preparation of the bis-type or polymeric salts. A group of useful compounds include the following:

A. Polyhalogen substituted alkanes such as methylene dibromide, methylene chloride, ethylene dibromide, propylene dibromide-1,2, butylene dichloride, ethylene and propylene di-iodides, isobutyl dibromide, tri-iodo-triethyl methane, bromoform, acetylene tetrabromide, hexabromethane, and aromatic substituted alkanes, e. g., benzylidene dichloride, xylylene dibromide, xylylene dichloride; cyclohexane dibromide-1,2, -1,3 and 1,4 etc.

B. Alkyl esters of alkylene and cycloalkylene sulfonic acids, such as methane disulfonic dimethyl ester, ethane and alpha-β disulfonic diethyl ester, ethane α:α disulfonic dimethyl ester, the diethyl ester of ethane α:β disulfonic acid, α:β propane disulfonic diethyl ester, α:β propane disulfonic diethyl ester, β-methyl propane α:β disulfonic dimethyl ester, the diethyl esters of n-hexane-, n-heptane and n-octane disulfonic acids, methane trisulfonic triethyl ester, ethane α:α:β trisulfonic triethyl ester, propane α:β:γ trisulfonic triethyl ester, etc.

C. Alkyl esters of arylene sulfonic acids such as the diethylester of phenyl disulfonic acid, the dimethyl ester of naphthalene disulfonic acid, the dimethyl ester of diphenyl disulfonic acid, the triethyl ester of phenyl trisulfonic acid.

D. Various alkyl disulfates such as dimethyl α:β ethane disulfate, diethyl α:β ethane disulfate, etc.

E. Esters of sulfonic acids with polyhydric alcohols, e. g., the alkyl cycloalkyl and aryl sulfonic acid esters with glycerol and the glycols. Suitable esters include:

Ethylene di(ethyl sulfonate)
Ethylene di(p-toluene sulfonate)
Ethylene di(cyclohexyl sulfonate)
p-Phenylene di(p-toluene sulfonate)
Propylene di(p-toluene sulfonate)
Hexamethylene di(p-toluene sulfonate)

F. Mixed compounds derived from combining functional aspects of A, B, C, D, and E, such as the α bromo, β ethyl sulfonates of ethane.

A considerable portion of the specific disclosure above has been devoted to a preferred aspect of the invention, namely, that in which the cation constitutes the entire polymeric cyanine dye base and the anions are attached to heterocyclic nitrogen atoms. However, it is clear from paragraphs A to E that the invention comprehends a type wherein the anion is polyvalent and the cations are simple cyanine dye bases. In the last mentioned type the linking radical forms an anion bridge, between the nitrogen atoms of the respective nuclei. Furthermore, the nitrogen atoms are pentavalent.

Various types of acid binding agents or solvents can be used in the dye condensation reactants. The particular one chosen depends somewhat on the initial reactants and the type of dye ultimately desired. Suitable agents include caustic soda, sodium alcoholates, e. g. sodium methylate, sodium ethylate, alcoholic caustic soda, alkali metal carbonates, orthophosphates and tetraborates; acid anhydrides, e. g. acetic anhydride, propionic anhydride, etc. alone or in the presence of sodium or potassium acetate, sodium nitrite, alkyl nitrites, organic nitrogen bases, e. g. pyridine, methyl pyridine, piperidine, methylamine, ethylamine.

After the dye condensations have been completed, the resulting polymeric cyanine salts may be converted into any desired specific salt by metathesis. If a bis type alkyl disulfonate is formed in the initial reaction, for instance, it can be converted into the corresponding bromide by treatment with aqueous sodium bromide. The bromide or alkyl disulfonate can be converted to the iodide by treatment with aqueous sodium iodide. Perchlorates can be obtained by the addition of $KClO_4$ to polymeric cyanine salts. Less soluble salts can be formed from the more soluble salts by a similar double decomposition reaction. Soluble salts of the polymeric cyanines can be made from halide salts by refluxing with a silver salt of the desired anion e. g. $Ag_2SO_4$, etc.

In place of the specific ortho esters of carboxylic acids set forth in the above examples can be substituted any ester of this type which is capable of reacting with the heterocyclic nitrogen compounds having a reactive methyl or methylene group. Suitable esters include trimethyl ortho-propionate, methyldiethyl n-caproate, methyldiethyl ortho-isocaproate, trimethyl ortho-valerate, trimethyl ortho-formate, trimethyl ortho-benzoate, trimethyl ortho-p-toluate, trimethyl ortho-gamma-phenoxy-butyrate, trimethyl ortho-phenyl-acetate, ethyl ortho-furoate, trimethyl ester of cyclohexyl carboxylic acid.

The polymeric cyanine dyes obtainable by this invention which contain a hydrocarbon radical between the nitrogen atoms of heterocyclic nitrogen nuclei as has been previously pointed out, are particularly useful in the preparation of spectrally sensitized photographic silver halide emulsions. They are not limited in their use to any particular type of silver salt, but apparently can be used with simple and mixed silver halide emulsions and mixed emulsions in general. Thus, they appear to have utility in silver chloride, silver bromide, silver-chloride-bromide, silver-bromide-iodide, silver-chloride-bromide-iodide, etc. emulsions. They are also useful in mixed emulsions for instance, those having the proportion of 25% chloride emulsions to 75% chlorobromide emulsion to 75% chloride emulsion to 25% chlorobromide emulsion. The dyes can be added to one or more of such emulsions prior to mixing.

In the preparation of photographic emulsions containing such novel dyes, it is necessary only to bring the dye into intimate contact with the light sensitive silver salt layer. This can be accomplished by dispersing the compounds in the emulsions before coating the light sensitive layers or afterwards by bathing or impregnating the layer with the polymeric dyes. It is convenient to add the dyes to the emulsions in the form of solutions in appropriate solvents. The solvent must, of course, be compatible with the emulsion, substantially free from any deleterious effect on the light-sensitive materials in the emulsions and capable of dissolving the dyes. Methanol is a satisfactory solvent for my new dyes. Acetone can be employed. The dyes are advantageously incorporated in the finished washed emulsions and should be uniformly distributed throughout the emulsions.

The concentration of my new dyes in the emulsions can vary widely, e. g., from about 2 to 100 mg. per liter of ordinary flowable gelatino-silver-halide emulsion. The concentration of dye will vary according to the type of light-sensitive materials employed in the emulsion and according to the effects desired. The suitable and most economical concentration for any given emulsion will be apparent to those skilled in the art, upon making ordinary tests and observations customarily employed in the art of emulsion-making. To prepare a gelatino-silver-halide emulsion, the following procedure is satisfactory: A quantity of the dye is dissolved in methyl alcohol or acetone and a volume of this solution (which may be diluted with water) containing from 2 to 100 mg. of dye is slowly added to 1000 cc. of a flowable gelatino-silver-halide emulsion with stirring. Stirring is continued until the dye is thoroughly incorporated in the emulsion. Ordinarily from 10 to 20 mgs. of our new dyes per liter of emulsion suffice to produce the maximum sensitizing effect.

The products of this invention are useful in photography, particularly as sensitizing dyes employed to extend the spectral sensitivity of gelatino silver halide emulsions in the manner known to the art. More specifically, they are particularly useful as sensitizing dyes for use in composite emulsions having two emulsion layers with markedly different gradations which are selectively sensitized to different regions of the spectrum. In addition, the compounds are useful in color photography for the preparation of bleaching out layers in which the dyes are unstabilized to light and can be bleached to form colored pictures by one or more of the processes known to the art. The products of the invention are also useful in the preparation of colored filter or screening layers both for photography and other fields of optical science. Because of their resinous nature many of the products contemplated in the invention are useful in the preparation of foils, films and coatings wherein they may be mixed with various hydrophilic colloids or similar materials, or they may be used alone to produce the desired film or coating element.

In some instances self-supporting films of the novel dyes can be made. Those types having colloidal properties might be used to replace gelatin and similar substances for photographic elements such as binding agents for light sensitive salts. Or they may be used as porous membranes or strata which could be impregnated with light sensitive salts. They could, furthermore, be used as filter layers, color layers, anti-abrasion layers, backing layers, etc.

The novel polymeric dyes can be used in conjunction with emulsion hardening agents, emulsion desensitizers, surface modifiers, fog-inhibiting agents, etc.

One of the most important advantages of the invention from the standpoint of photographic utility is that it permits the adsorption of sensitizing dye molecules on silver halide grains in multi-molecular layers of controllable depth and configuration. Of comparable advantage is the fact that the invention provides a series of cyanine-type sensitizing dyes which are "non-wandering" or substantially non-diffusible through the hydrophilic colloids such as gelatin which comprise the binding materials of silver halide emulsions. True, non-wandering sensitizing dyes permit mixed halide emulsions to be prepared having outstanding properties for sharply recording individual spectral bands. A further advantage is that the invention permits the preparation of photographic layers from self-binding dye materials which form cohesive resistant films suitable for light-sensitive silver halide layers, bleachable dye layers or filter layers. A still further advantage is that the invention provides dyes of the cyanine class substantive to materials which normally could not be dyed. Another advantage resides in the fact that the invention makes possible the preparation of highly colored films, foils, filaments and plastics in which the dye molecule is an integral part of the synthetic material.

As many apparently widely different embodiments of this invention may be made without departing from the spirit and scope thereof, it is to be understood that the invention is not to be limited except as defined by the appended claims.

I claim:

1. The process which comprises reacting (1) a quarternary salt of a heterocyclic nitrogen compound containing 2 to 3 heterocyclic nitrogen nuclei usual in cyanine dyes, each of which contain a reactive group which enters into a cyanine dye condensation, in a position taken from the group consisting of alpha and gamma positions to the heterocyclic nitrogen atom and an anion, the heterocyclic nitrogen atoms of said nuclei being linked together by a hydrocarbon radical, the nitrogen atoms being joined to a carbon atom of said hydrocarbon with (2) a heterocyclic nitrogen salt containing a reactive group which enters into a cyanine dye condensation, in a position taken from the group consisting of alpha and gamma positions to the heterocyclic nitrogen atom until a polymeric cyanine dye having at least two molecules of a cyanine dye salt linked together through a heterocyclic nitrogen atom terminal to the conjugated chain of atoms of each by a hydrocarbon radical, the terminal nitrogen atoms being attached to a carbon atom of said hydrocarbon radical taken from the group consisting of aliphatic and cycloaliphatic carbon atoms is formed.

2. The process which comprises reacting (1) a bis salt of a heterocyclic nitrogen compound containing 2 heterocyclic nitrogen nuclei usual in cyanine dyes, each of which contain a reactive group which enters into a cyanine dye condensation, in a position taken from the group consisting of alpha and gamma positions to the heterocyclic nitrogen atom and an anion, the heterocyclic nitrogen atoms of said nuclei being linked together by a hydrocarbon radical, the nitrogen atoms being joined to a carbon atom of said hydrocarbon radical with (2) a heterocyclic nitrogen salt containing a reactive group which enters into a cyanine dye condensation, in a position taken from the group consisting of alpha and gamma positions to the heterocyclic nitrogen atom in the presence of an acid binding agent until a polymeric cyanine dye having at least two molecules of a cyanine dye salt linked together through a heterocyclic nitrogen atom terminal to the conjugated chain of atoms of each by a hydrocarbon radical, the terminal nitrogen atoms being attached to a carbon atom of said hydrocarbon radical taken from the group consisting of aliphatic and cycloaliphatic carbon atoms is formed.

3. The process which comprises reacting (1) a bis salt of a heterocyclic nitrogen compound containing 2 heterocyclic nitrogen nuclei usual in cyanine dyes each of which contain a reactive methyl group in a position taken from the class consisting of alpha and gamma positions to the heterocyclic nitrogen atom with (2) a heterocyclic nitrogen salt containing a reactive methyl group in a position taken from the class consisting of alpha and gamma positions to the heterocyclic nitrogen atoms, and with (3) an orthocarboxylic acid ester in the presence of an acid binding agent until there is formed a polymeric carbocyanine dye selected from the group consisting of compounds of the following formula

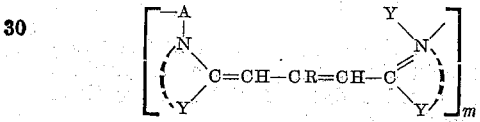

and

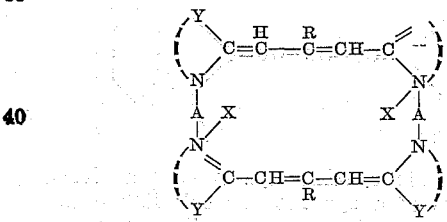

wherein A is a hydrocarbon radical in which the bonds are attached directly to a carbon atom taken from the group consisting of aliphatic and cycloaliphatic carbon atoms, Y constitutes the atoms necessary to complete a heterocyclic nitrogen nucleus usual in cyanine dyes, X is an acid radical, R is a member taken from the group consisting of hydrogen and hydrocarbon radicals and $m$ is a positive integer, the free bond attached to A in each successive unit being linked to the free bond attached to N in each successive unit to form a polymeric chain having recurring units of the above formula.

4. The process which comprises heating a compound of the formula:

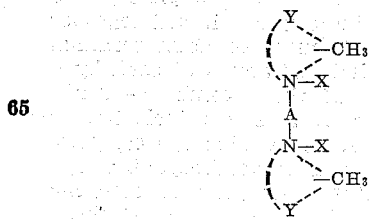

wherein Y is the atoms necessary to complete a heterocyclic nitrogen nucleus usual in cyanine dyes, A being a hydrocarbon radical, the heterocyclic nitrogen atom being attached to a carbon atom of said hydrocarbon radical taken from the group consisting of aliphatic and cycloaliphatic carbon atoms, and X is an acid radical with an ortho-carboxylic acid ester in the presence of an acid binding agent to produce a polymeric cyanine dye containing more than one radical of the formula:

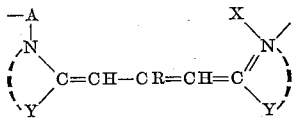

wherein A, X, and Y have the above significance and R is a member of the group consisting of hydrogen and hydrocarbon radicals.

5. The process which comprises heating a compound of the formula:

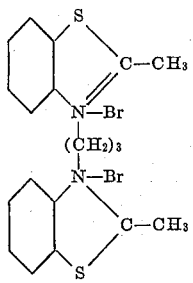

with an ortho-carboxylic acid ester in the presence of an acid binding agent so as to produce a polymeric cyanine dye containing more than one radical of the formula:

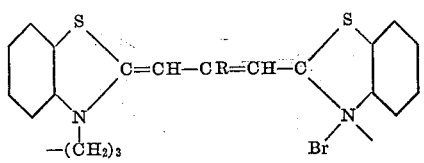

6. A polymeric cyanine dye having at least two molecules of a cyanine dye salt linked together through a heterocyclic nitrogen atom terminal to the conjugated chain of atoms of each by a hydrocarbon radical, the terminal nitrogen atoms being attached to a carbon atom of said hydrocarbon radical taken from the group consisting of aliphatic and cycloaliphatic carbon atoms.

7. A polymeric thiacarbocyanine dye having at least two molecules of a thiacarbocyanine dye salt linked together through a heterocyclic nitrogen atom terminal to the conjugated chain of atoms of each by a hydrocarbon radical, the terminal nitrogen atoms being attached to a carbon atom of said hydrocarbon radical taken from the group consisting of aliphatic and cycloaliphatic carbon atoms.

8. A polymeric cyanine dye comprising two molecules of a cyanine dye salt linked together through a heterocyclic nitrogen atom terminal to the conjugated chain of atoms of each by a hydrocarbon radical of the formula $(-CH_2)_n$ where $n$ is an integer from 1 to 6 inclusive.

9. A polymeric thiacarbocyanine dye comprising two molecules of a thiacarbocyanine dye bromide linked together through a heterocyclic nitrogen atom terminal to the conjugated chain of atoms of each by a hydrocarbon radical of the formula $(-CH_2)_n$ where $n$ is an integer from 1 to 6 inclusive.

10. A polymeric carbocyanine dye selected from the group consisting of compounds of the following formula:

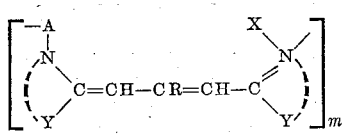

and

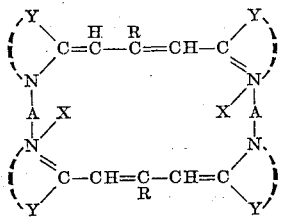

wherein A is a hydrocarbon radical in which the bonds are attached directly to a carbon atom taken from the group consisting of aliphatic and cycloaliphatic carbon atoms, Y constitutes the atoms necessary to complete a heterocyclic nitrogen nucleus usual in cyanine dyes, X is an acid radical, R is a member taken from the group consisting of hydrogen and hydrocarbon radicals and $m$ is a positive integer the free bond attached to A being attached to the free bond attached to N in each successive unit to form a polymeric chain having recurring units of the above formula.

11. A polymeric carbocyanine dye of the formula:

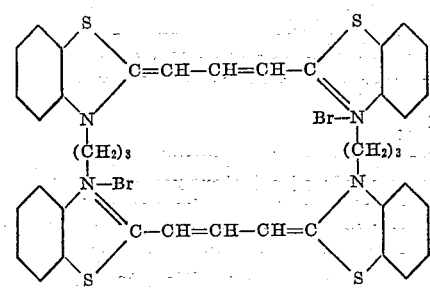

12. A polymeric carbocyanine dye containing at least two radicals of the formula:

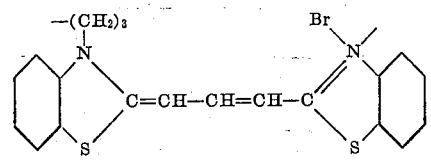

wherein the free bonds attached to nitrogen and $(CH_2)_3$ respectively are attached to a $(-CH_2-)_3$ and nitrogen atoms of a similar cyanine dye nucleus.

CYRIL D. WILSON.

REFERENCES CITED

The following references are of record in the file of this patent:

UNITED STATES PATENTS

| Number | Name | Date |
|---|---|---|
| 780,741 | Berendes | Jan. 24, 1905 |
| 1,653,314 | Schuloff | Dec. 20, 1927 |
| 1,994,562 | Brooker | Mar. 19, 1935 |
| 442,741 | Vogel | Dec. 16, 1890 |
| 1,372,548 | Renwick | Mar. 22, 1921 |
| 2,282,116 | Brooker | May 5, 1942 |
| 2,231,659 | Brooker | Feb. 11, 1941 |
| 2,186,608 | Keyes | Jan. 9, 1940 |

(Other references on following page)

UNITED STATES PATENTS

| Number | Name | Date |
|---|---|---|
| 2,230,789 | Winter | Feb. 4, 1941 |
| 2,112,139 | Brooker | Mar. 22, 1938 |
| 2,211,408 | Dieterle | Aug. 13, 1940 |
| 2,207,915 | Dieterle | July 16, 1940 |
| 2,049,058 | Gleason | July 28, 1936 |
| 2,158,287 | Konig | May 16, 1939 |
| 2,204,188 | Reister | June 11, 1940 |
| 2,199,542 | Konig | May 7, 1940 |
| 2,242,224 | Bley | May 20, 1941 |
| 2,242,223 | Bley | May, 1941 |

FOREIGN PATENTS

| Number | Country | Date |
|---|---|---|
| 575,114 | Germany | Apr. 23, 1933 |

OTHER REFERENCES

Proc. Roy. Soc. (London), 96 B. 317–333 (1924). (Also in Chem. Abstracts 19:530.) (Copy in S. L.)

Brit. Med. Journal, 1922, I 514–515. (Also in Chem. Abstracts 16:3101.) (Copy in S. L.)

Certificate of Correction

Patent No. 2,425,772. August 19, 1947.

CYRIL D. WILSON

It is hereby certified that errors appear in the printed specification of the above numbered patent requiring correction as follows: Column 6, line 18, for "anthracenazoles" read *anthracenoazoles*; line 49, for "bartituric" read *barbituric*; column 10, lines 7 to 15 inclusive, for that portion of the formula reading

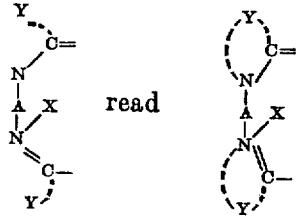

lines 33 to 37 inclusive, strike out the formula and insert instead the following:

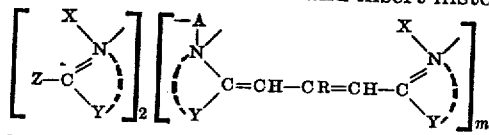

column 11, line 3, for the word "of" after "maximum" read *at*; line 72, for "3-3" read *3-3'*; and that the said Letters Patent should be read with these corrections therein that the same may conform to the record of the case in the Patent Office.

Signed and sealed this 23rd day of March, A. D. 1948.

[SEAL]

THOMAS F. MURPHY,
*Assistant Commissioner of Patents.*